(12) United States Patent
Powell et al.

(10) Patent No.: US 11,841,152 B2
(45) Date of Patent: Dec. 12, 2023

(54) SYSTEM AND METHOD FOR OPERATING AN HVAC SYSTEM CONTROLLER

(71) Applicant: Carrier Corporation, Palm Beach Gardens, FL (US)

(72) Inventors: Bradley D. Powell, Indianapolis, IN (US); Keith David Heigl, Huntington, IN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 705 days.

(21) Appl. No.: 16/342,854

(22) PCT Filed: Oct. 18, 2017

(86) PCT No.: PCT/US2017/057248
§ 371 (c)(1),
(2) Date: Apr. 17, 2019

(87) PCT Pub. No.: WO2018/075678
PCT Pub. Date: Apr. 26, 2018

(65) Prior Publication Data
US 2019/0264938 A1  Aug. 29, 2019

Related U.S. Application Data

(60) Provisional application No. 62/409,801, filed on Oct. 18, 2016.

(51) Int. Cl.
| | |
|---|---|
| *F24F 11/32* | (2018.01) |
| *F24F 11/88* | (2018.01) |
| *F24F 11/65* | (2018.01) |
| *F24F 11/70* | (2018.01) |
| *G05D 23/19* | (2006.01) |
| *F24F 1/32* | (2011.01) |

(52) U.S. Cl.
CPC ............ *F24F 1/32* (2013.01); *F24F 11/65* (2018.01); *F24F 11/70* (2018.01); *F24F 11/88* (2018.01); *G05D 23/1917* (2013.01)

(58) Field of Classification Search
CPC .. F24F 11/32; F24F 11/88; F24F 11/65; F24F 11/70
USPC ........................................................ 700/276
See application file for complete search history.

(56) References Cited

U.S. PATENT DOCUMENTS

| | | |
|---|---|---|
| 5,316,073 A | 5/1994 | Klaus et al. |
| 5,706,190 A | 1/1998 | Russ et al. |

(Continued)

FOREIGN PATENT DOCUMENTS

WO  2016060836 A1  9/2015

OTHER PUBLICATIONS

International Seach Report and Written Opinion for application PCT/US2017/057248, dated Mar. 15, 2018, 11 pages.

*Primary Examiner* — Md Azad
(74) *Attorney, Agent, or Firm* — CANTOR COLBURN LLP

(57) ABSTRACT

An HVAC system controller is provided having a first output terminal electrically coupled to at least one component, and a second output terminal electrically coupled to the at least one component. A processing device controls the first output terminal and the second output terminal. If the first output terminal fails, the processing device changes a state of at least one of the first output terminal and the second output terminal.

10 Claims, 4 Drawing Sheets

(56) References Cited

U.S. PATENT DOCUMENTS

| | | | |
|---|---|---|---|
| 5,729,474 | A | 3/1998 | Hildebrand et al. |
| 6,619,055 | B1 | 9/2003 | Addy |
| 8,509,954 | B2 | 8/2013 | Imes et al. |
| 8,740,101 | B2 | 6/2014 | Leen et al. |
| 8,902,071 | B2 | 12/2014 | Barton et al. |
| 8,950,687 | B2 | 2/2015 | Bergman et al. |
| 8,950,688 | B2 | 2/2015 | Babich |
| 9,026,254 | B2 | 5/2015 | Warren et al. |
| 9,115,908 | B2 | 8/2015 | Shetty et al. |
| 9,244,471 | B2 | 1/2016 | Watts et al. |
| 2009/0140065 | A1 | 6/2009 | Juntenen et al. |
| 2013/0186613 | A1 | 7/2013 | Estiban |
| 2013/0331995 | A1 | 12/2013 | Rosen |
| 2014/0041846 | A1* | 2/2014 | Leen ............... F24F 11/30 165/208 |
| 2014/0058567 | A1 | 2/2014 | Matsuoka et al. |
| 2014/0203092 | A1 | 7/2014 | Broniak et al. |
| 2014/0316583 | A1* | 10/2014 | Ambriz ............ F24F 11/30 700/277 |
| 2014/0319233 | A1 | 10/2014 | Novotny et al. |
| 2015/0034729 | A1* | 2/2015 | Warren ............. H01R 43/26 236/1 C |
| 2015/0176854 | A1* | 6/2015 | Butler ............... G05D 23/19 700/278 |
| 2016/0195294 | A1* | 7/2016 | Conner ............. G01R 31/00 236/1 C |

* cited by examiner

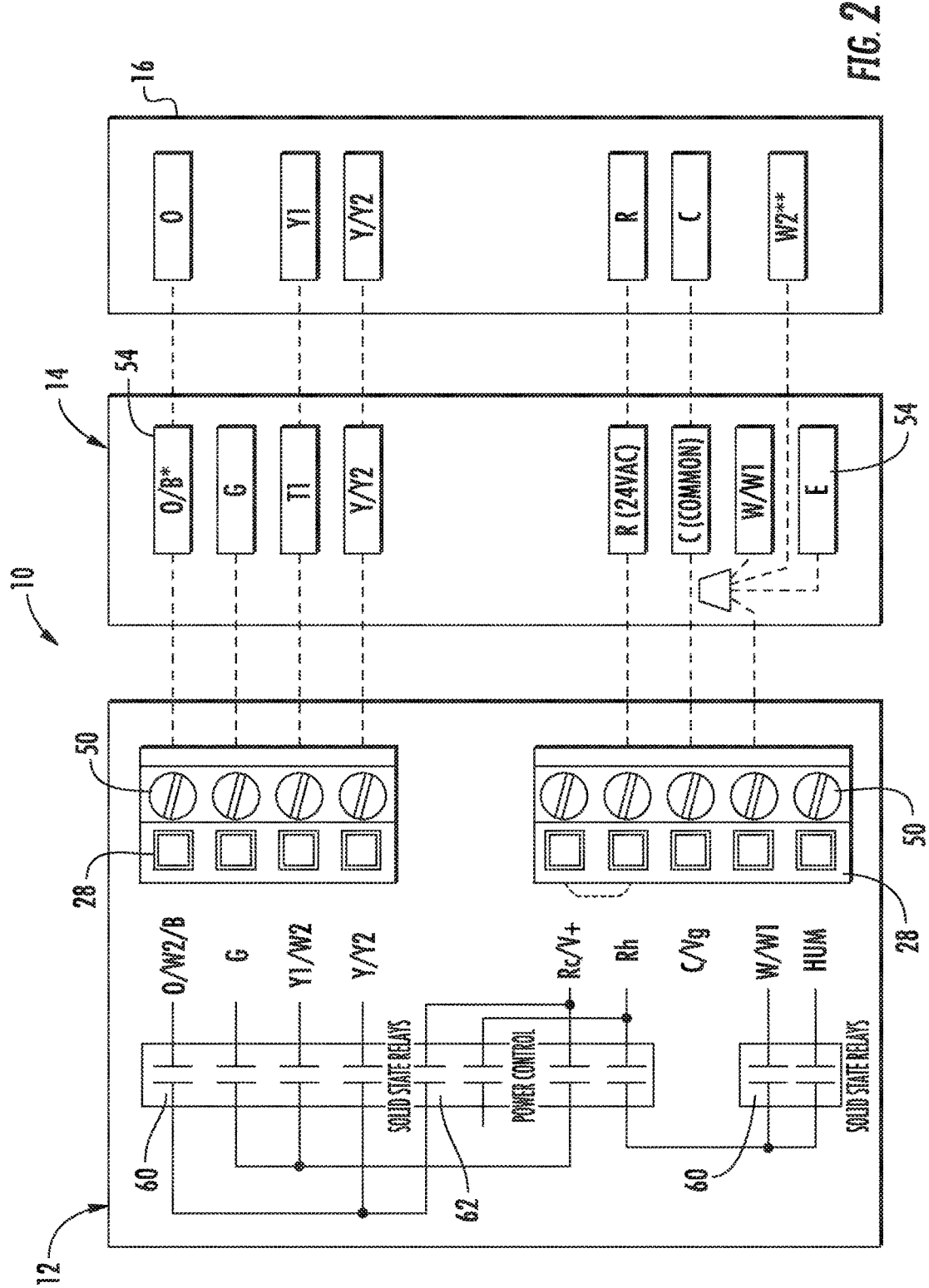

SYSTEM AND METHOD FOR OPERATING AN HVAC SYSTEM CONTROLLER

CROSS REFERENCE TO RELATED APPLICATION

The present application is an international patent application, which claims priority to U.S. Patent Application Ser. No. 62/409,801, filed Oct. 18, 2016, which is herein incorporated in its entirety.

TECHNICAL FIELD OF THE EMBODIMENTS

The disclosed embodiments generally relate to an HVAC system controller and, more particularly, to a system and method for operating an HVAC system controller.

BACKGROUND OF THE EMBODIMENTS

Generally, proper operation of an HVAC system controller requires the HVAC system controller to output 24 Vac to HVAC equipment to control various operating stages of the equipment. Unfortunately, relays can fail shorted or open circuited. Solid state relays can fail similarly and also in an intermediate way which can output half waves, which can be detrimental to the connected equipment. Detecting these failure modes is required to mitigate any harmful responses from the equipment. Previously, a relay failure would cause the whole HVAC system controller to cease functioning due to its loss of output capability. In the case of a solid state relay, if half of the relay's output capability were to fail, a half wave signal could be output without the HVAC system controller detecting the problem. This can damage the connected valves and/or relays in the equipment.

SUMMARY OF THE EMBODIMENTS

In one aspect, an HVAC system controller is provided having a first output terminal electrically coupled to at least one component, and a second output terminal electrically coupled to the at least one component. A processing device controls the first output terminal and the second output terminal. If the first output terminal fails, the processing device changes a state of at least one of the first output terminal and the second output terminal.

In an aspect of the above, if a solid state relay associated with the first output terminal fails in the open position, the processing device turns off the first output terminal by commanding the solid state relay associated with the first output terminal to remain open and turns on the second output terminal by commanding a solid state relay associated with the second output terminal to close.

In an aspect of any of the above, if a solid state relay associated with the first output terminal fails intermittently, the processing device turns off the first output terminal by commanding the solid state relay associated with the first output terminal to remain open and turns on the second output terminal by commanding a solid state relay associated with the second output terminal to close.

In an aspect of any of the above, if a solid state relay associated with the first output terminal fails in the closed position, the processing device utilizes a power control relay to turn off the second output terminal by opening the power control relay to prevent voltage from passing to a solid state relay associate with the second output terminal and then closes the power control relay to pass voltage to the solid state relay associated with the second output terminal when the HVAC system controller calls for at least one of heating or cooling.

In an aspect of any of the above, the HVAC system controller includes a display. The processing device sends an error message to the display if the first output terminal fails.

In an aspect of any of the above, the processing device facilitates mitigating a loss of the first output terminal by changing the state of at least one of the first output terminal and the second output terminal.

In one aspect, an HVAC system is provided having at least one component, and a HVAC system controller having a first output terminal electrically coupled to at least one component, and a second output terminal electrically coupled to the at least one component. A processing device controls the first output terminal and the second output terminal. If the first output terminal fails, the processing device changes a state of at least one of the first output terminal and the second output terminal.

In an aspect of the above, if a solid state relay associated with the first output terminal fails in the open position, the processing device turns off the first output terminal by commanding the solid state relay associated with the first output terminal to remain open and turns on the second output terminal by commanding a solid state relay associated with the second output terminal to close.

In an aspect of any of the above, if a solid state relay associated with the first output terminal fails intermittently, the processing device turns off the first output terminal by commanding the solid state relay associated with the first output terminal to remain open and turns on the second output terminal by commanding a solid state relay associated with the second output terminal to close.

In an aspect of any of the above, if a solid state relay associated with the first output terminal fails in the closed position, the processing device utilizes a power control relay to turn off the second output terminal by opening the power control relay to prevent voltage from passing to a solid state relay associate with the second output terminal and then closes the power control relay to pass voltage to the solid state relay associated with the second output terminal when the HVAC system controller calls for at least one of heating or cooling.

In an aspect of any of the above, the HVAC system controller includes a display. The processing device sends an error message to the display if the first output terminal fails.

In an aspect of any of the above, the processing device facilitates mitigating a loss of the first output terminal by changing the state of at least one of the first output terminal and the second output terminal.

In one aspect, a method of operating an HVAC system controller including a processing device in electrical communication with a first output terminal and a second output terminal is provided. The method includes operating the processing device to transmit a signal to the first output terminal; operating the processing device to determine whether the first output terminal has failed; and operating the processing device to change a state of at least one of the first output terminal and the second output terminal, if the processing device determined that the first output terminal failed.

In an aspect of any of the above, the processing device is further in electrical communication with a first solid state relay associated with the first output terminal and a second solid state relay associated with the second output terminal. The method further comprises: if the first solid state relay fails in the open position, then: operating the processing device to turn off the first output terminal by commanding the first solid state relay to remain open; and operating the processing device to turn on the second output terminal by commanding the second solid state relay to close.

In an aspect of any of the above, the processing device is further in electrical communication with a first solid state relay associated with the first output terminal and a second solid state relay associated with the second output terminal. The method further comprises: if the first solid state relay fails intermittently, then: operating the processing device to turn off the first output terminal by commanding the first solid state relay to remain open; and operating the processing device to turn on the second output terminal by commanding the second solid state relay to close.

In an aspect of any of the above, the processing device is further in electrical communication with a first solid state relay associated with the first output terminal, a second solid state relay associated with the second output terminal, and a power control relay, and wherein the power control relay is in electrical communication with the first solid state relay. The method further comprises: if the first solid state relay fails in a closed position, then: operating the processing device to turn off the first output terminal by opening the power control relay to prevent a signal from passing to the first solid state relay; and operating the processing device to turn on the first output terminal by closing the power control relay to pass the signal to the first solid state relay when the processing device initiates a call to operate in a first conditioning mode.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein:

FIG. 2 is a schematic view of an HVAC system showing the internal wiring of an HVAC system controller in accordance with an embodiment.

DETAILED DESCRIPTION OF THE EMBODIMENTS

Figure 1:
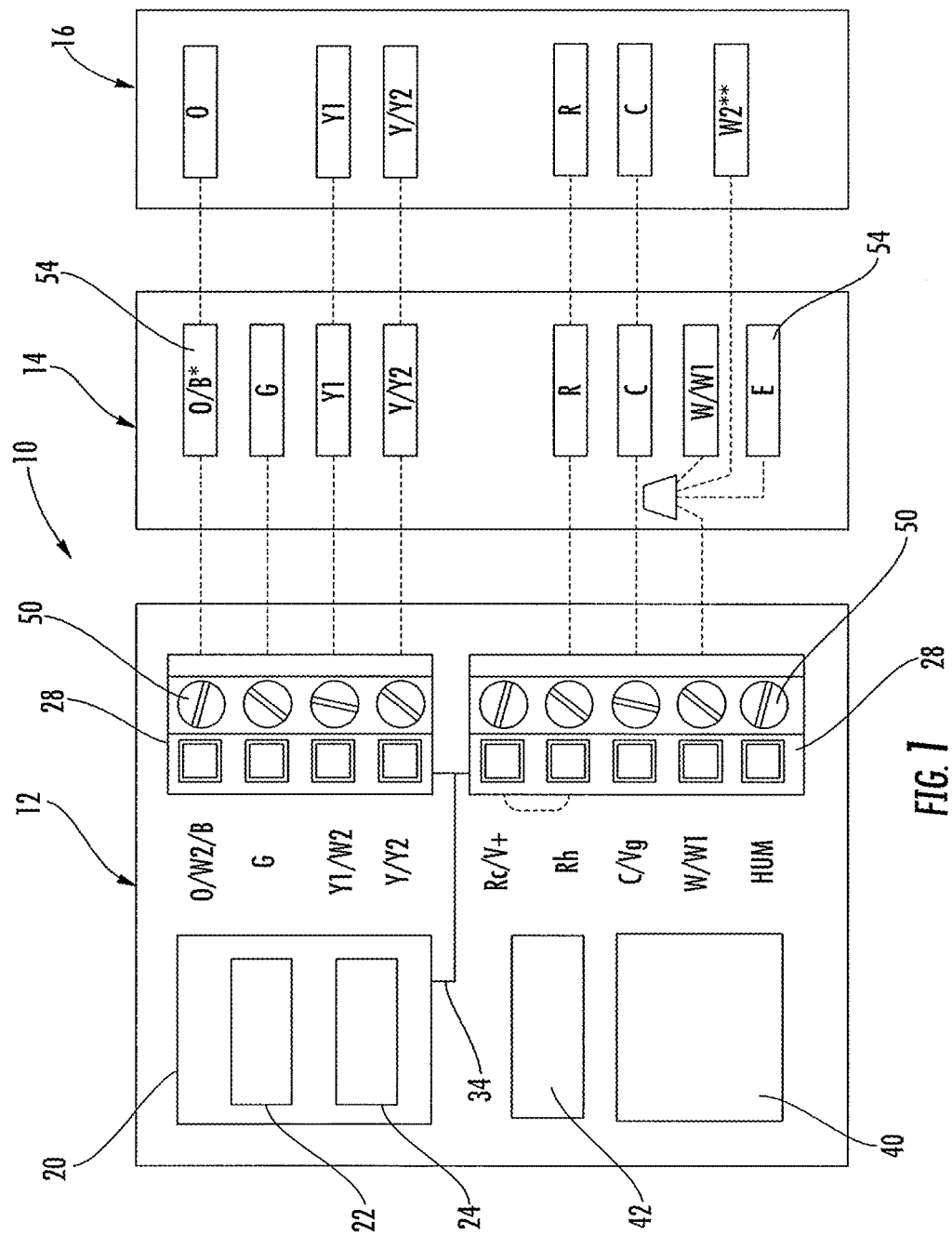
FIG. 1 is a schematic view of an HVAC system in accordance with an embodiment.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 schematically illustrates an embodiment of an HVAC system, generally indicated at 10. The HVAC system 10 includes an HVAC system controller 12 operably coupled to a first HVAC component 14 and a second HVAC component 16. In an embodiment, the HVAC system controller 12 includes a thermostat. In other embodiments, the HVAC system controller 12 may include a computer, laptop, etc. to name a few non limiting examples. The HVAC system controller 12 is configured to control the operation of the first HVAC component 14 and the second HVAC component 16 to deliver conditioned air to an interior space (not shown). It will be appreciated that either the first HVAC component 14 or the second HVAC component 16 may be an indoor HVAC unit, for example, a furnace, fan coil, geothermal heat pump, oil furnace, etc. to name a few non limiting examples. It will further be appreciated that either the first HVAC component 14 or the second HVAC component 16 may be an outdoor HVAC unit, for example, an air conditioner, heat pump, packaged unit, etc. to name a few non-limiting examples.

HVAC system controller 12 includes a processing device 20 that further includes a microprocessor 22 and a memory 24, and may be, for example, capable of storing and reading input data, performing calculations, and reporting the results of calculations. In an embodiment, the HVAC system controller 12 further includes a connector 28 configured to accept a wiring configuration based in part on the equipment type of either the first HVAC unit 14 or the second HVAC unit 16. For example, the connector 28 may have several designations (e.g., "O", "B", "G", "W", "W1", "W2", "Y", "Y1", "Y2", "Rc", "V+" "Rh", "Vg", "C", "Hum", "D1", "D2", etc.) associated with a particular respective terminal 50 on the connector 28. Although connector 28 is illustrated in the figures as comprising two separate terminal blocks, those skilled in the art will recognize that connector 28 may also comprise a single terminal bock or more than two terminal blocks. In an embodiment, as illustrated in FIG. 2, the HVAC system controller 12 also includes solid state relays 60 and at least one power control relay 62. The power control relays 62 are in series with at least some of the solid state relays 60 and are operative to switch on or switch off power to the solid state relays 60. In an embodiment, the power control relays 62 comprise double pole relays configured such that each relay switches Rc/V+ on one contact and Rh on the other contact. This allows each power control relay 62 to have the potential to provide power to one or more first solid state relays 60 coupled to a first contact of the power control relay 62, or to provide power to one or more second solid state relays 60 coupled to a second contact of the power control relay. In the illustrated embodiment, the first and second contacts of each power control relay 62 are coupled to solid state relays 60 controlling various functions of the HVAC system 10 such that loss of a function controlled by one solid state relay 60 can be mitigated by selecting another solid state relay 60 that may provide a substitute option for any particular function, as described in greater detail hereinbelow. In the illustrated embodiment, the power control relays 62 are coupled to the solid state relays 60 as follows:

Relay 1 contact 1: (Rh)
W/W1
Relay 1 contact 2: (Rc/V+)
Y1, G
Relay 2 contact 1: (Rh)
HUM
Relay 2 contact 2: (Rc)
O/W2/B
Y/Y2

Other connection schemes may be used in other embodiments. Respective wires may be connected from the terminal 50 to the same terminal designations 54 found on a first HVAC unit 14 and/or on a second HVAC 16.

In one embodiment, the HVAC system controller 12 includes a user interface element 40, such as a graphical user interface (GUI), a touch screen display, an LCD display, or other means by which a user of the HVAC system 10 can be apprised of system status and/or particular characteristics of the HVAC system 10. In an embodiment, the HVAC system controller 12 also has a user input element 42, such as a keypad, keyboard, touch screen or other data input means, which allows a user of the HVAC system 10 to change the operation of the HVAC system 10. It will be appreciated that the user input element 42 may be incorporated into the user interface element 40.

Figure 3A:
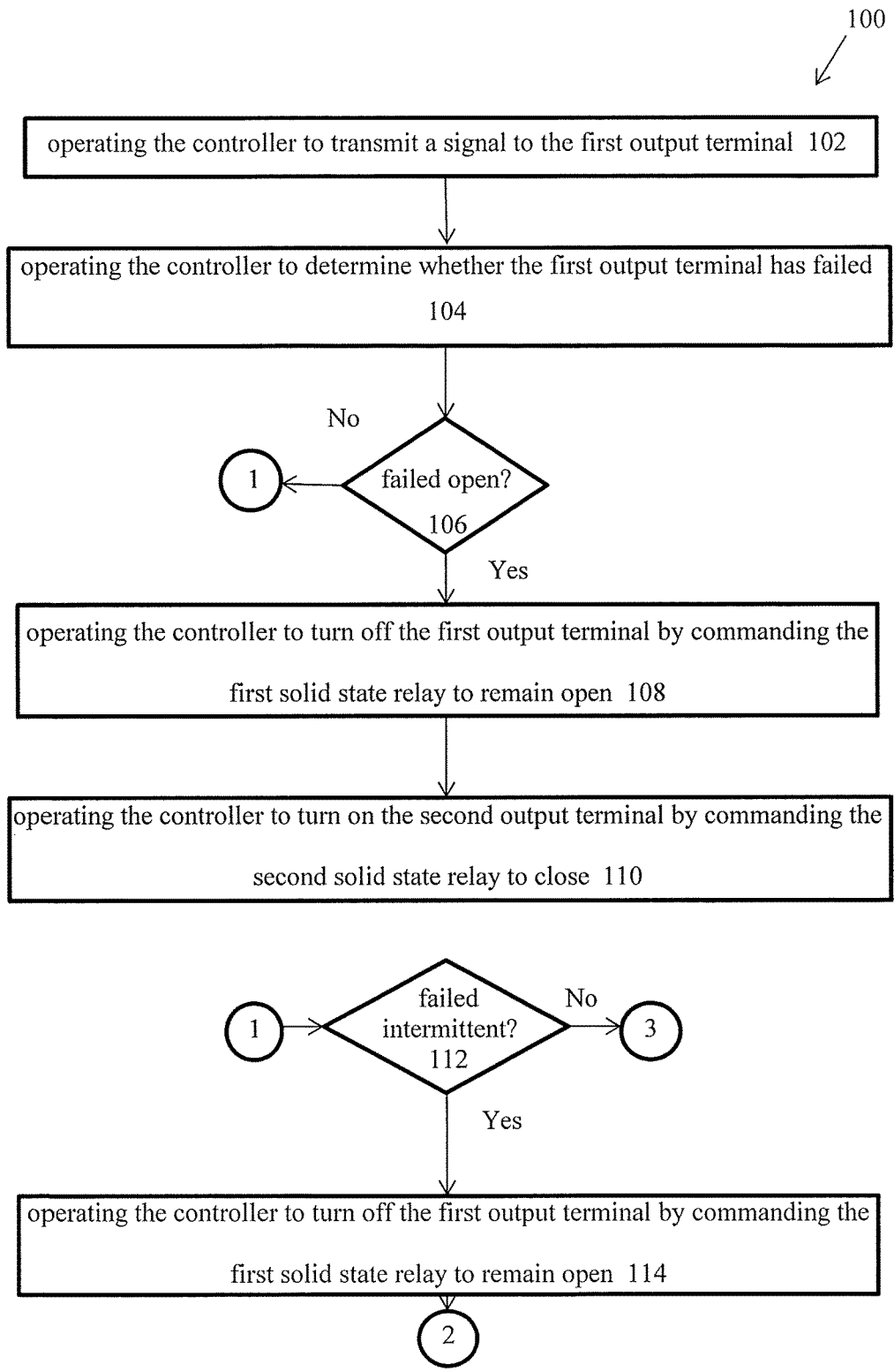
FIGS. 3A-B are flow diagrams showing a method of operating an HVAC system controller in accordance with an embodiment.
Figure 3B:
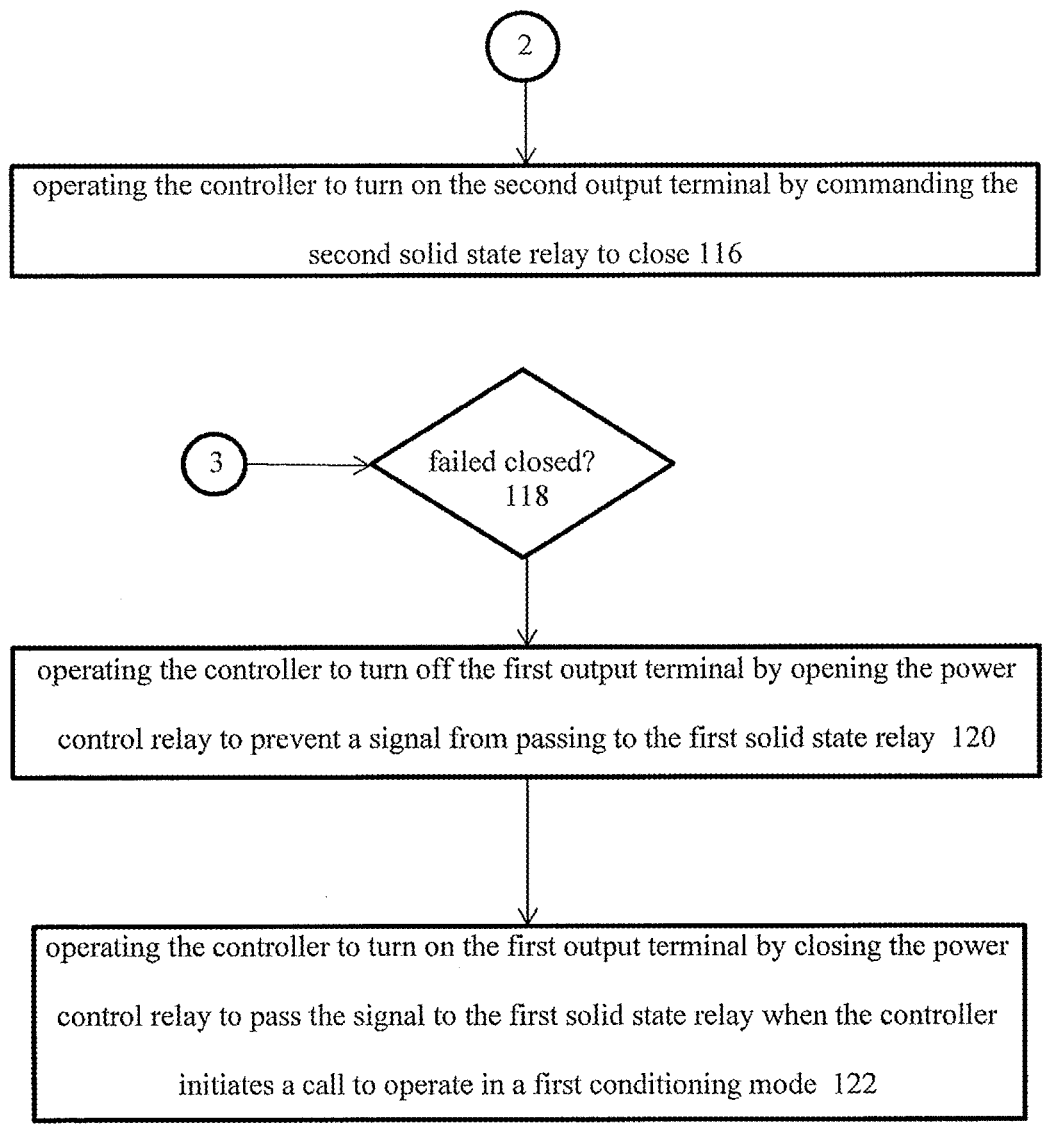

With reference to the method 100 illustrated in FIGS. 3A-B, in one embodiment the processing device 20 controls a state of the output terminals 50 at step 102. In an embodiment utilizing the solid state relay 60, the processing device 20 senses at step 102 the failed output terminal 50 by routing a relay output through a level shifter and back to the controller's analog-to-digital converter so that the processing device 20 can examine the output waveform. In one embodiment utilizing standard mechanical relays, the relay is provided with two sets of contacts. One set of contacts drives the HVAC equipment and the other set of contacts provides a feedback to the processing device 20 as to which state the relay is in. In one embodiment, if a first output terminal 50 fails in the open position (i.e., the associated solid state relay 60 has failed in the open position), the processing device 20 senses that the first output terminal 50 has failed in the open position at step 106. The controller then turns off the failed first output terminal 50 at step 108 by commanding the associated solid state relay 60 to remain open and mitigates the loss of the failed first output terminal 50 by turning on at least one second output terminal 50 at step 110 by closing the associated solid state relay 60 coupled to the second output terminal 50. In some instances, the at least one second output terminal 50 controls a similar function (heating, cooling, etc.). In some embodiments, a notification is then sent to the user interface element 40.

In one embodiment, if the first output terminal 50 fails intermittently (i.e., the associated solid state relay 60 is sending a half-wave signal), the processing device 20 senses that the first output terminal 50 has failed, as described above, at step 112. The processing device 20 then turns off the failed first output terminal 50 at step 114 by commanding the associated solid state relay 60 to remain open to avoid damaging the first HVAC component 14 and the second HVAC component 16 with the half wave signal. The processing device 20 then mitigates the loss of the failed first output terminal 50 by turning on at least one second output terminal 50 at step 116 by closing the associated solid state relay 60 coupled to the second output terminal 50. In some instances, the at least one second output terminal 50 controls a similar function (heating, cooling, etc.). In some embodiments, a notification is then sent to the user interface element 40.

In one embodiment, if the first output terminal 50 fails in the closed position (i.e., the associated solid state relay 60 has failed in the closed position), the processing device 20 senses that the first output terminal 50 has failed, as described above, at step 118 and opens the power control relay 62 to turn off the failed first output terminal 50 at step 120. In some embodiments, a notification is then sent to the user interface element 40. When the processing device 20 initiates a call to operate in a conditioning mode requiring the first terminal 50 to be closed, the processing device 20 turns on the first terminal 50 at step 122 by closing the power control relay 62 to provide a signal to the first solid state relay 60.

The present embodiments enable continued HVAC operation when a terminal of the HVAC system controller 12 fails open, closed, or intermittently. For example, if the "W" terminal 50 of the HVAC system controller 12 were to fail (i.e., the associated solid state relay 60 has failed), heat from the furnace would no longer be possible. In winter this could cause pipes to freeze and become damaged. In the present embodiments, once the loss of "W" control were detected, and if a heat pump is connected, the HVAC system controller 12 can turn on the outputs to the "Y" and "O" terminals 50 to heat exclusively from the heat pump. In other embodiments, cold air may not be available during the summer due to failure of a terminal 50. By operating an alternative component at least some cold air may be produced by the system 10.

In another example, the system 10 operates in a cooling mode and the "O/B" terminal 50 connected to a heat pump is configured to be active during cooling. In such an embodiment, if the "O/B" terminal 50 fails in the open position (i.e., the associated solid state relay 60 has failed in the open position), the system 10 may produce too much cool air for the interior space. In such an embodiment, the "Y1", "Y/Y2" terminals 50 connected to the outdoor unit and the "G" terminal 50 connected to the fan of the indoor unit may be shut off by commanding the associated solid state relay 60 to remain open to reduce cool air flow.

In another example, the system 10 operates in a cooling mode and the "O/B" terminal 50 connected to a heat pump is configured to be active during heating. In such an embodiment, if the "O/B" terminal 50 fails in the open position (i.e., the associated solid state relay 60 has failed in the open position), the system 10 may remain unaffected because the heat pump is not necessary in the cooling mode. In such an embodiment, the system 10 may continue to cool by operating the "Y1" and "Y/Y2" terminals 50 of the outdoor unit by commanding the associated solid state relays 60 to remain closed.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. An HVAC system controller comprising:
   a first output terminal;
   a second output terminal; and
   a processing device electrically coupled to the first output terminal and the second output terminal;
   wherein the processing device is configured to control signals to the first output terminal and the second output terminal; and
   wherein, if the first output terminal fails, the processing device changes a state of at least one of the first output terminal and the second output terminal;
   wherein changing the state of at least one of the first output terminal and the second output terminal includes the second output terminal controlling the function associated with the failed, first output terminal.

2. The HVAC system controller of claim 1, further comprising:
   a first solid state relay associated with the first output terminal; and
   a second solid state relay associated with the second output terminal.

3. The HVAC system controller of claim 2, wherein if the first solid state relay fails in an open position, the processing device turns off the first output terminal by commanding the first solid state relay to remain open and turns on the second output terminal by commanding the second solid state relay to close.

4. The HVAC system controller of claim 2, wherein, if the first solid state relay fails intermittently, the processing device turns off the first output terminal by commanding the first solid state relay to open and turns on the second output terminal by commanding the second solid state relay to close.

5. The HVAC system controller of claim 2 further comprising:
a power control relay in electrical communication with the first solid state relay and the controller, wherein, if the first solid state relay fails in a closed position, the processing device utilizes the power control relay to turn off the first output terminal.

6. The HVAC system controller of claim 5, wherein the processing device utilizes the power control relay to turn off the first output terminal by opening the power control relay to prevent a signal from passing to the first solid state relay and then closes the power control relay to pass the signal to the first solid state relay when the processing device initiates a call to operate in a first conditioning mode.

7. The HVAC system controller of claim 1 further comprising a display operably coupled to the processing device, wherein the processing device sends an error message to the display if the first output terminal fails.

8. The HVAC system controller of claim 1, wherein the HVAC system controller comprises a thermostat.

9. An HVAC system comprising:
at least one HVAC component; and
an HVAC system controller operably coupled to the at least one HVAC component, the HVAC system controller comprising:
a first output terminal;
a second output terminal; and
a processing device electrically coupled to the first output terminal and the second output terminal;
wherein the processing device is configured to control signals to the first output terminal and the second output terminal; and wherein, if the first output terminal fails, the processing device changes a state of at least one of the first output terminal and the second output terminal;
wherein changing the state of at least one of the first output terminal and the second output terminal includes the second output terminal controlling the function associated with the failed, first output terminal.

10. An HVAC system controller comprising:
a first output terminal;
a second output terminal;
a first solid state relay associated with the first output terminal;
a second solid state relay associated with the second output terminal;
a power control relay in electrical communication with the first solid state relay and the controller;
a processing device electrically coupled to the first output terminal and the second output terminal;
wherein the processing device is configured to control signals to the first output terminal and the second output terminal;
wherein, if the first output terminal fails, the processing device changes a state of at least one of the first output terminal and the second output terminal;
wherein if the first solid state relay fails in an open position, the processing device turns off the first output terminal by commanding the first solid state relay to remain open and turns on the second output terminal by commanding the second solid state relay to close;
wherein, if the first solid state relay fails intermittently, the processing device turns off the first output terminal by commanding the first solid state relay to open and turns on the second output terminal by commanding the second solid state relay to close;
wherein, if the first solid state relay fails in a closed position, the processing device utilizes the power control relay to turn off the first output terminal by opening the power control relay to prevent a signal from passing to the first solid state relay and then closes the power control relay to pass the signal to the first solid state relay when the processing device initiates a call to operate in a first conditioning mode.

* * * * *